March 3, 1970 — M. E. WILSON — 3,498,580

TUNNEL PLUG MEMBER FOR USE IN MAKING DENTAL PROSTHONDONTICS

Filed Oct. 21, 1965 — 2 Sheets-Sheet 1

INVENTOR
MELVIN E. WILSON
BY
ATTORNEY

INVENTOR
MELVIN E. WILSON
BY
ATTORNEY

United States Patent Office 3,498,580
Patented Mar. 3, 1970

3,498,580
TUNNEL PLUG MEMBER FOR USE IN MAKING DENTAL PROSTHODONTICS
Melvin E. Wilson, 2182 Keheley Drive, Decatur, Ga. 30032
Filed Oct. 21, 1965, Ser. No. 499,866
Int. Cl. A61c 9/00
U.S. Cl. 249—54                    1 Claim

ABSTRACT OF THE DISCLOSURE

A tunnel plug member of tear-away construction for use with a pin in the model for making dental impressions. The plug is shaped to be withdrawn from the tunnel by tearing away from the pin and in one form this is facilitated by a hole and a partially cut portion. The plug may be made from plastic or rubber.

---

The basic art of the dental prosthodontics is well known to the extent that for the reconstruction and repair of teeth it is presently customary in the art to make an impression in rubber or similar material by making an impression into a tray of the rubber material which thereafter hardens so that a firm material such as plaster or a plastic material may be poured into the mold and the tray and removed therefrom and used as the basis for making the prosthodontics crowns or fillings or particular items to be used. The die, which is a hard copy of one or more of the prepared teeth and which is made from the soft rubber impression, is provided on the underside with dowel pins that are used in a base so that the die may be separated from the base and removed therefrom so that particular teeth or more than one tooth may be separated for access. The setting of the dowel pins is an important function in this operation since this determines to some extent the accuracy of the alignment of the die when separated and also the ease of operation. The impression tray and the arrangement thereof is also important since this relates to the setting of the pins. Also, it is desirable to create tunnels or openings in the base of the model to reach the dowel pins so that they may be lifted and a means should be provided for creating these tunnels during the pouring of the base and to be present after the material has hardened.

The plug member for creating tunnels in the model comprises a solid, three-dimensional member which is tapered in construction and is preferably made from a flexible material such as rubber or plastic. One end of the plug is formed in a tapered and curved condition and has an opening therein generally corresponding to the tapered portion of a dowel pin and having a slot leading to the outside of that end. The plug is positioned in the base on the pin before the base material is poured and then after the base model material has hardened the plug may be removed simply by pulling same from the dowel pin through the slot which extends from the dowel pin opening to the outside of the plug.

Two or more positive locating positions on the handle of the tray that correspond to the like position on the clamp of the arm so that the tray can be located, and returned to the nearby exact position.

Another feature is the dowel pin setting means and especially the coupling which connects a pin with the clamp.

Other and further objects and advantages of my invention will become apparent upon reading the following specification taken in conjunction with the accompanying drawings, in which.

Figure 1:
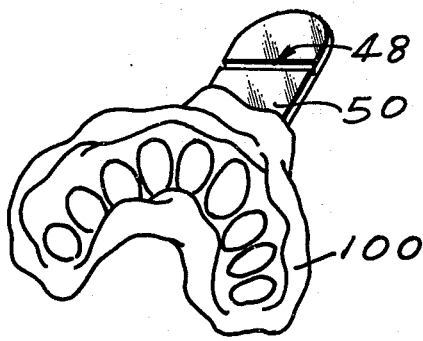
FIG. 1 is a plan view of a rubber impression in a tray.
Figure 2:
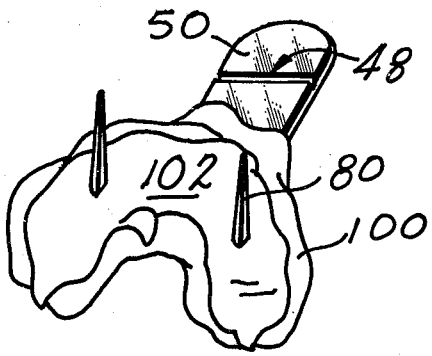
FIG. 2 is a plan view of the poured die with dowel pins in place poured into the impression shown in FIG. 1.
Figure 3:
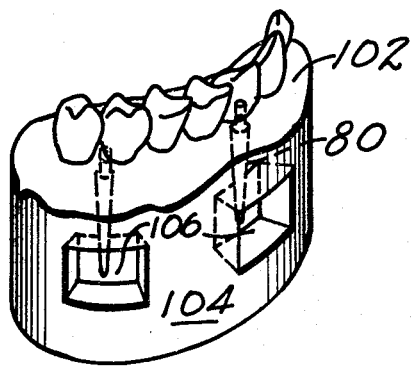
FIG. 3 is a perspective view of a die and base having open tunnels therein.
Figure 4:
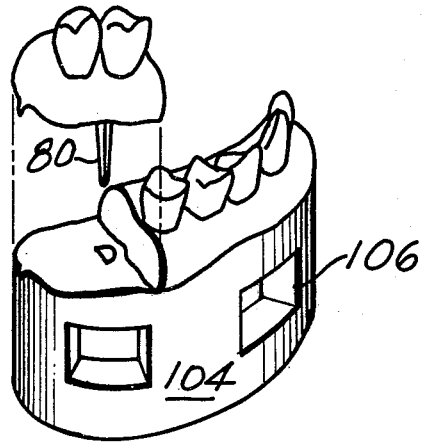
FIG. 4 is a perspective view of the die and base shown in FIG. 3, with a portion cut and separated and lifted with a dowel pin.
Figure 5:
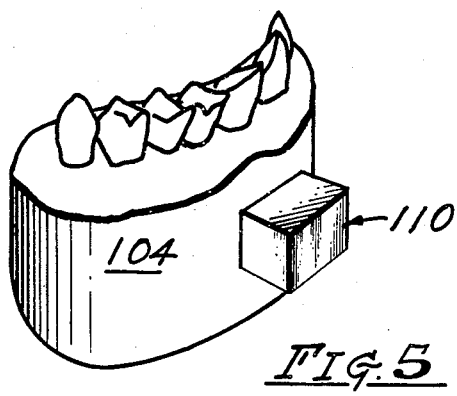
FIG. 5 is a perspective view of a die and base with one of the removable tunnel plugs of the present invention therein.
Figure 6:
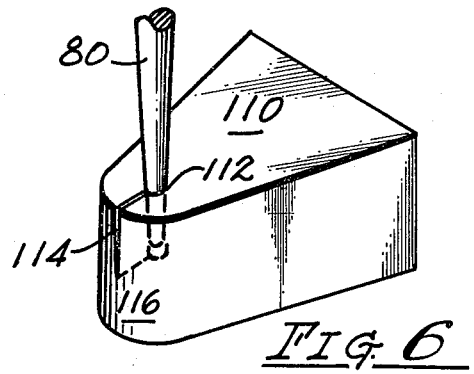
FIG. 6 is a perspective view of the tunnel plug of the present invention with a portion of a dowel pin therein.
Figure 7:
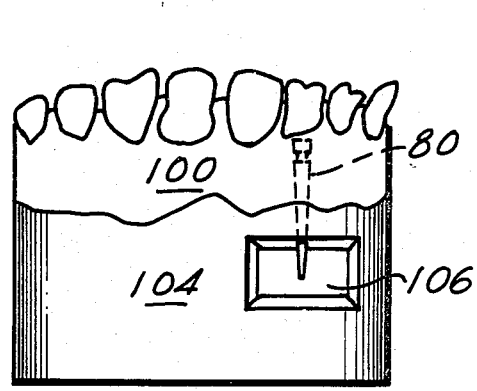
FIG. 7 is a side elevation view of the plug and die and base shown in FIG. 5.
Figure 8:
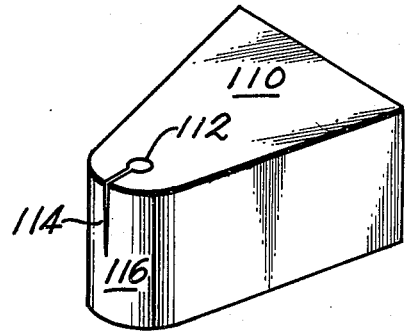
FIG. 8 is a perspective view of one of the plugs by itself.

In conventional manner, a dental tray 48 with lip 50 has an impression 100 and the operator places the dowel pins 80 into a dental impression 100 extending upwardly therefrom in the desired location. As many pins 80 as needed for the particular work on the die are located at this time. Then, the hardening material which makes the die is poured into the impression 100, and the pour encompasses the pins and firmly incases them in the hardened die. The impression 100 shown in FIG. 1 receives the hardened material 102 which makes the die shown in FIG. 3 with the dowel pins 80 extending upwardly therefrom. Then the die 102 is removed from the impression 100 and provided with a base of hardened material 104 by placing the die 102 on a mold and pouring the hardening material for the base 104 therein. Prior to this, since it will be necessary to locate and lift the dowel pins 80 thereafter, tunnels 106 are formed in the base 104 and as seen in FIG. 5 this is accomplished through the use of tunnel forming plug members 110 which are constructed from rubber or similar material such as plastic. Each of the members 110 is provided with an opening 112 that is generally shaped to the configuration of and complimentary to the lower end of a dowel pin 80 and which opening 112 leads through an open slot 114 to the exterior end 116 of the plug member 110. When the base 104 is poured with the plug member 110 in place, the tunnel 106 is created since the plug 110 is immovable from the hardened material 104. This is accomplished simply by pulling the plug out of the base 104 and which does not present any problem or disturb the alignment of the dowel pin 80 since the pin will pass from the plug through the slot 114 as the plug is removed and pulled from the base 104. Then, as seen in FIG. 7, an instrument may be used to lift the bottom end of the dowel pin 80 after the portion of the die 100 has been cut away by a saw. This is illustrated in FIG. 4 which shows a portion of the die 102 lifted from the rest of the die 102.

I claim:
1. In a tunnel plug member for use in making dental impressions to be included in the tunnel leading into the model, comprising:
  (a) a tapered plug member constructed of rubber-like or plastic-like material of solid, resilient tear-away construction, the said plug member having sides tapering from a front to the rear occupying the tapered tunnel in the model,
  (b) and a small hole in the end of said plug to receive the end of a dowel pin therein, there being a weakened break-away portion leading from said hole whereby when it is desired to open the tunnel to the model the plug may be removed from the pin by physically pulling same to cause said plug to break away from the pin.

References Cited

UNITED STATES PATENTS

| | | | |
|---|---|---|---|
| 3,226,827 | 1/1966 | Spalten | 249—54 X |
| 3,286,350 | 11/1966 | Cooper | 249—54 X |
| 3,157,934 | 11/1964 | Williams | 249—183 |
| 2,842,845 | 7/1958 | Carlson | 32—67 |

J. SPENCER OVERHOLSER, Primary Examiner

D. W. JONES, Assistant Examiner

U.S. Cl. X.R.

18—34.1; 32—11; 249—183; 264—16